United States Patent
Fasullo et al.

(10) Patent No.: US 6,169,649 B1
(45) Date of Patent: Jan. 2, 2001

(54) DETECTION CIRCUIT FOR CIRCUIT PROTECTION DEVICES OF A POWER SUPPLY AND METHOD OF OPERATION THEREOF

(75) Inventors: Greg H. Fasullo, Dallas; Jin He; John A. Herrmann, both of Plano; Greg P. Jorgenson, Quinlan, all of TX (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/354,980

(22) Filed: Jul. 16, 1999

(51) Int. Cl.[7] .................................................. H02H 1/00
(52) U.S. Cl. .............................. 361/115; 361/58; 361/104
(58) Field of Search ................................ 361/115, 56, 58, 361/111, 113, 119, 104, 103

(56) References Cited

U.S. PATENT DOCUMENTS

| | | | |
|---|---|---|---|
| 4,164,632 | * | 8/1979 | Aagaard .......................... 179/175.3 R |
| 5,534,768 | * | 7/1996 | Chavannes et al. .................. 323/267 |

OTHER PUBLICATIONS

Specification sheets from "Bussman® Circuit Protection Solutions" by Cooper Bussman; 1995; 5 pages total—p. 148 is a specification sheet for "Telpower® Specialty Fuses".
Specification sheets from "Shawmut Advisor" by Gould Shawmut; 1993; 5 pages total—pp. 161 and 162 are specification sheets for "Amp–trap® Fuses".

* cited by examiner

*Primary Examiner*—Stephen W. Jackson

(57) ABSTRACT

For use with a power supply having first and second circuit protection devices, a detection circuit, a method of monitoring the protection devices and a power supply employing the circuit or the method. In one embodiment, the detection circuit includes (1) a bridge circuit coupled to the first and second circuit protection devices, (2) a resistor parallel-coupled across one of the first and second circuit protection devices and (3) a sensing circuit, coupled to the bridge circuit and the resistor, that senses an imbalance in the bridge circuit and develops therefrom a failure signal when at least one of the first and second circuit protection devices becomes inoperable.

20 Claims, 3 Drawing Sheets

US 6,169,649 B1

DETECTION CIRCUIT FOR CIRCUIT PROTECTION DEVICES OF A POWER SUPPLY AND METHOD OF OPERATION THEREOF

TECHNICAL FIELD OF THE INVENTION

The present invention is directed, in general, to power electronics and, more specifically, to a detection circuit for circuit protection devices of a power supply, a method of monitoring the protection devices and a power supply employing the circuit or the method.

BACKGROUND OF THE INVENTION

Circuit protection devices (such as fuses) are widely employed in various industrial and commercial apparatus to protect against over-current and short circuit conditions. The circuit protection devices are also employed to comply with the requirements of safety agencies. At least two input-line circuit protection devices are generally required for a single-phase three-wire input power conversion system.

As a result of the important functions performed by the circuit protection devices, it is necessary to reliably monitor the operation thereof. In many applications wherein fuses are employed as the circuit protection devices, the fuses are equipped with blown fuse indicators. Generally, the underlying systems that monitor the fuses employ thermal-mechanical apparatuses to indicate the existence of a blown fuse. Many fuse manufacturers, for instance, use trigger devices or trigger actuators wired in parallel with the fuses being monitored. The trigger devices include a mechanical actuator (e.g., a strike pin) that exerts a static force of approximately one pound to activate an add-on switch when the fuse is blown. The trigger devices, however, may only be employed in parallel with a fuse that is rated at 70A or higher. A minimum voltage drop of 5–10 volts is also required across an open fuse to assure a reliable blown fuse indication. Further, the trigger devices add about 2–5 amps to the long term current carrying capability of the fuse.

Obviously, employing multiple mechanical devices per fuse leads to questions regarding the reliability of such a detection system including the susceptibility of such devices to detrimental environmental conditions such as dust, temperature and vibration. Additionally, the trigger devices and the associated equipment, are bulky and quite expensive. As a result, a detection system employing the mechanical components (such as the components described above) may not be optimal for many applications.

Other commonly employed detection circuits include multiple circuits, often one circuit per circuit protection device, to monitor the operation of the circuit protection devices. For instance, FIG. 1 illustrates a schematic diagram of a power supply system 100 employing a conventional fuse detection circuit 120. The power supply system 100 includes a AC power source 110 coupled to power conversion equipment 115 (e.g., a power converter). First and second fuses 105a, 105b are interposed between the AC power source 110 and power conversion equipment 115 to provide short-circuit, ground fault and overcurrent protection to the power conversion equipment 115.

The conventional fuse detection circuit 120 consists of a first stage 130 that is coupled between the AC power source 110 and the first and second fuses 105a, 105b and a second stage 130' that is coupled between the first and second fuses 105a, 105b and the power conversion equipment 115. The first and second stages 130, 130' each consist of identical components. Each of the first and second stages includes a safety fuse 131, 131' coupled to the first fuse 105a and to a metal-oxide-varistor (MOV) 132, 132', which is further coupled to the second fuse 105b. The MOV 132, 132' is used for input power surge protection. A first current limiting resistor 133, 133', an opto-coupler 135, 135' and a second current limiting resistor 134, 134' are coupled across the MOV 132, 132'. Furthermore, a capacitor 136, 136' is coupled across the output terminal of the opto-coupler 135, 135' and to a pull-up resistor 137, 137'. The first and second stages 130, 130' are powered from an isolated 5 V source.

The conventional fuse detection circuit 120 senses first and second voltages across the first and second fuses 105a, 105b, respectively. The opto-couplers 135, 135' (which are bi-directional in nature) draw current from the AC lines via the current limiting resistors 133, 134, 133', 134'. When both the first and second voltages are sensed across the current limiting resistors 133, 134, 133', 134', the opto-couplers 135, 135' turn on the transistors of the opto-couplers 135, 135' and transmit logic low signals to a controller (not shown). The logic low signal indicates that the first and second fuses 105a, 105b are operational. Otherwise, if one of the first and second voltages is not sensed across the current limiting resistors 133', 134', the opto-coupler 135' turns off and transmits a logic high signal to the controller, indicating that at least one of the first and second fuses 105a, 105b or the safety fuse 131' is blown.

While the conventional fuse detection circuit 120 does monitor the status of the first and second fuses 105a, 105b, it suffers from the following limitations. In addition to the obvious drawback of size and cost associated with multiple circuits to accomplish the intended purpose, the opto-couplers 135, 135' suffer from finite current transfer ratio restrictions that limit their use in many applications. Due to the limited current transfer ratio, the opto-couplers 135, 135' require a certain amount of current to operate properly. Thus, the resistance of the current limiting resistors 133, 134, 133', 134' is limited to a lesser value and, consequently, the current limiting resistors 133, 134, 133', 134' may dissipate a fair amount of energy. For instance, if the power converter 115 has a wide input voltage range (e.g., 85–270 Vrms), the total power dissipation of the current limiting resistors (e.g., 25 kΩeach) 133, 134, 133', 134' can be as high as 5.6 watts, which represents about a 1.4% efficiency reduction for a 400 watt power converter and about a 0.56% reduction for a 1000 watt power converter.

To counteract some of the problems described above, the current limiting resistors 133, 134, 133', 134' should have high wattage and voltage ratings. The higher rated components, however, add cost and size to the conventional fuse detection circuit 120. Additionally, since the conventional fuse detection circuit 120 samples the voltages across the first and second fuses 105a, 105b, it drains power from the overall system and is susceptible to high AC line voltages and surges. As a result, other protection devices (such as metal-oxide varistors) should be included with the conventional fuse detection circuit 120 to protect the components thereof.

Accordingly, what is needed in the art is a system and method for monitoring the operability of the circuit protection devices that overcomes the deficiencies of the prior art.

SUMMARY OF THE INVENTION

To address the above-discussed deficiencies of the prior art, the present invention provides, for use with a power supply having first and second circuit protection devices, a detection circuit, a method of monitoring the protection devices and a power supply employing the circuit or the method. In one embodiment, the detection circuit includes (1) a bridge circuit coupled to the first and second circuit protection devices, (2) a resistor parallel-coupled across one of the first and second circuit protection devices and (3) a sensing circuit, coupled to the bridge circuit and the resistor, that senses an imbalance in the bridge circuit and develops therefrom a failure signal when at least one of the first and second circuit protection devices becomes inoperable.

The present invention, in one aspect, introduces the concept of monitoring multiple circuit protection devices (e.g., fuses) to determine an operability thereof and generating a failure signal when one or more of the circuit protection devices becomes inoperable.

In one embodiment of the present invention, the sensing circuit includes a sensing resistor and a rectifying diode. In an alternative embodiment, the sensing circuit includes an isolation transformer. Of course, other sensing circuits are well within the broad scope of the present invention.

In one embodiment of the present invention, the first and second circuit protection devices are fuses. Of course, other circuit protection devices (e.g., circuit breakers) are well within the broad scope of the present invention.

In one embodiment of the present invention, the detection circuit further includes an alarm generation circuit, coupled to the sensing circuit, that generates an alarm signal based upon the failure signal.

In one embodiment of the present invention, the alarm generation circuit includes a differential mode amplifier, a low pass filter and a voltage level comparator. In an alternative embodiment, the alarm generation circuit includes a rectifier, a filter and a voltage level comparator. Of course, other alarm generation circuits are well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
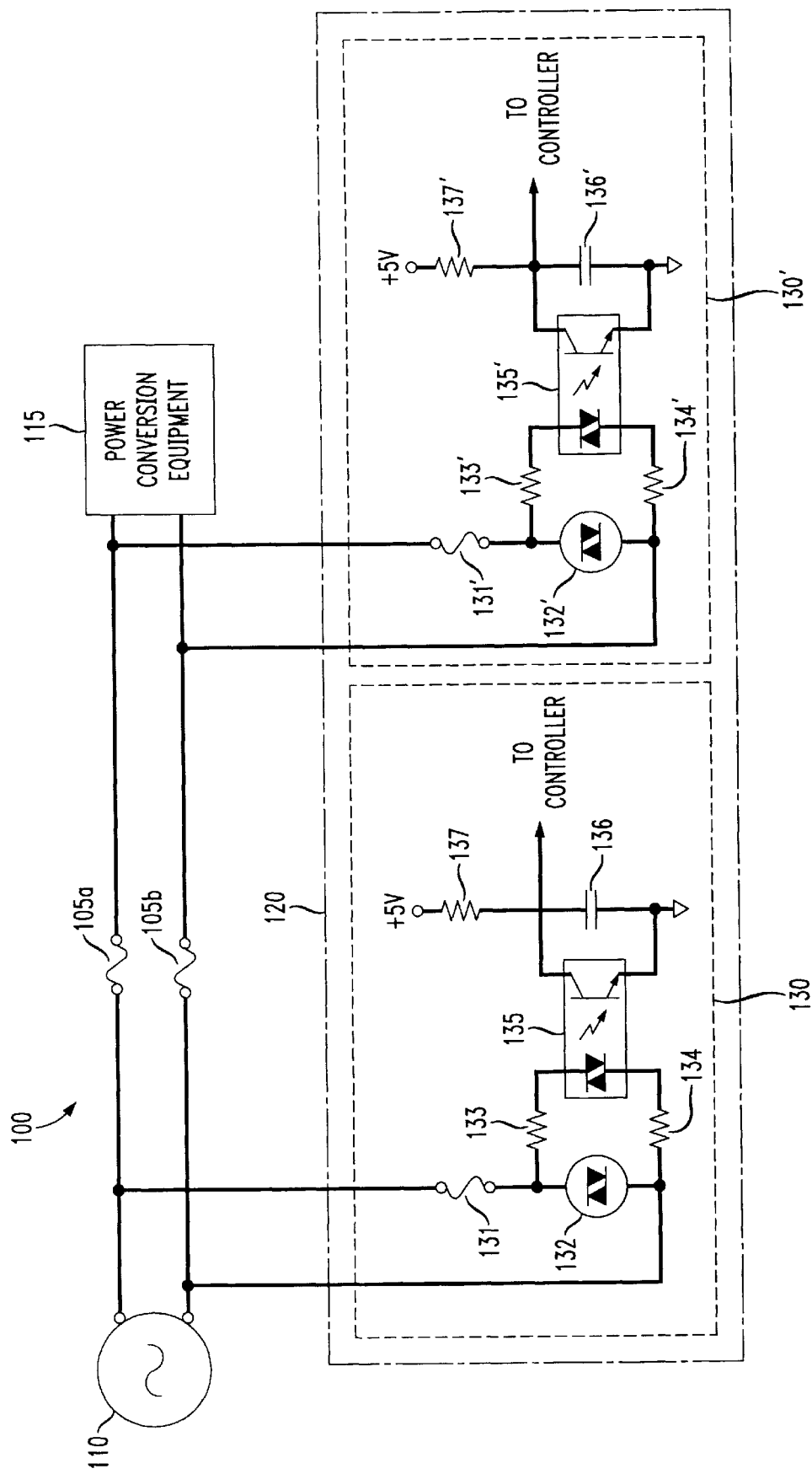
FIG. 1 illustrates a schematic diagram of a power supply system employing a conventional fuse detection circuit.
Figure 2:
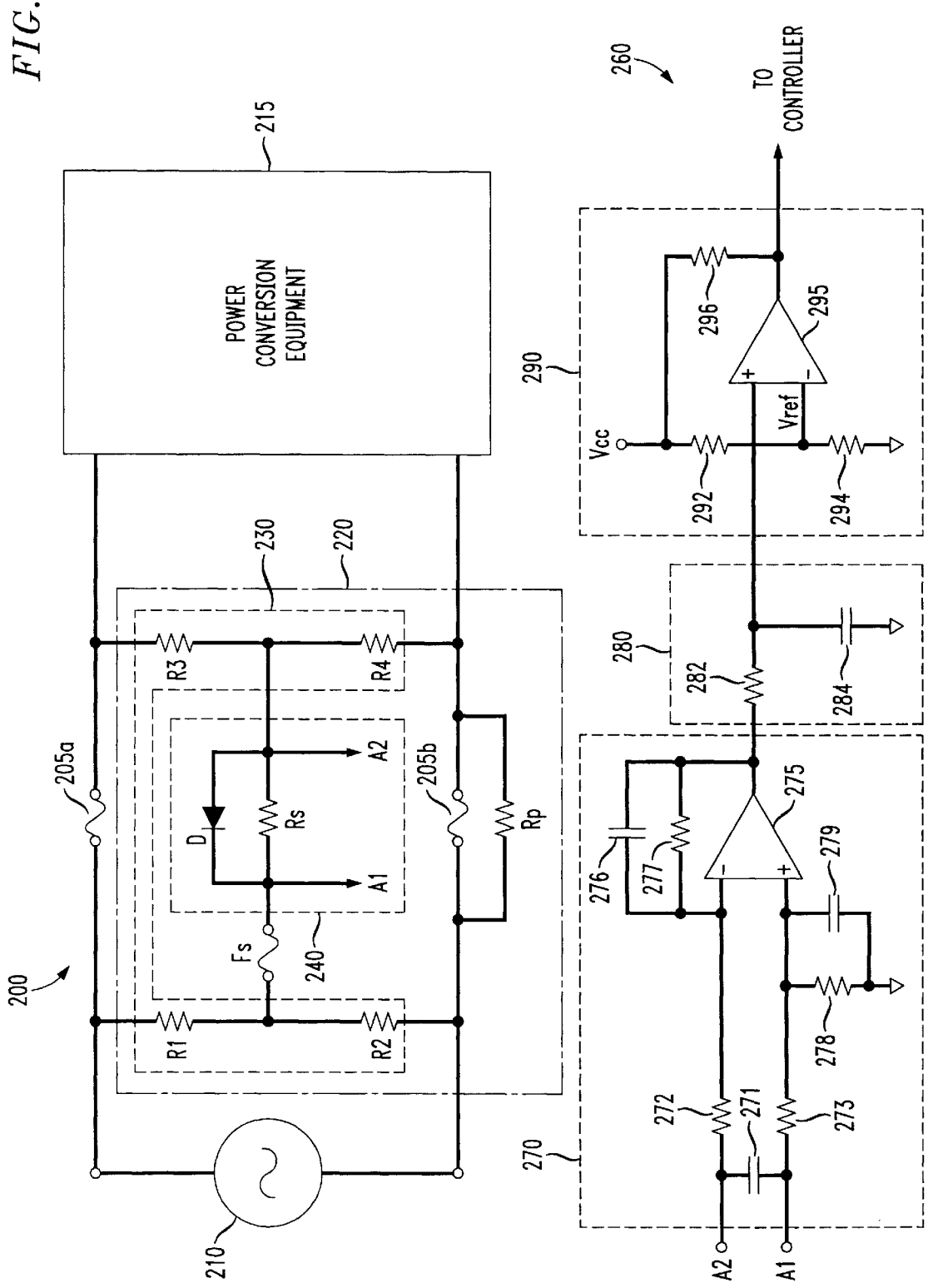
FIG. 2 illustrates a schematic diagram of an embodiment of a power supply constructed in accordance with the principles of the present invention.

Referring now to FIG. 2, illustrated is a schematic diagram of an embodiment of a power supply 200 constructed in accordance with the principles of the present invention.

The power supply 200 is coupled to a source of electrical power (e.g., an AC power source) 210 and includes power conversion equipment (e.g., a power converter such as a switch-mode rectifier) 215. The power supply 200 further includes first and second circuit protection devices (e.g., fuses) 205a, 205b interposed between the source of electrical power 210 and the power conversion equipment 215 to provide short circuit, ground fault and overcurrent protection to the power conversion equipment 215.

The power supply 200 further includes a detection circuit 220 that monitors the first and second circuit protection devices 205a, 205b to determine an operability thereof. The power supply 200 still further includes an alarm generation circuit 260 coupled to the detection circuit 220. The alarm generation circuit 260 receives a failure signal from the detection circuit 220 and generates an alarm signal based on the failure signal.

The detection circuit 220 includes a bridge circuit 230 coupled to the first and second circuit protection devices 205a, 205b. In the illustrated embodiment, the bridge circuit 230 includes first, second, third and fourth resistors R1, R2, R3, R4 arranged in a bridge network. While the bridge circuit 230 illustrated and described includes four resistors, other bridge networks are well within the broad scope of the present invention.

The detection circuit 220 further includes a resistor (parallel resistor Rp) parallel-coupled across one of the first and second circuit protection devices 205a, 205b. In the illustrated embodiment, the parallel resistor Rp is coupled across the second circuit protection device 205b. In an alternative embodiment, the parallel resistor Rp may be coupled across the first circuit protection device 205a.

The detection circuit 220 further includes a sensing circuit 240 coupled to the bridge circuit 230 and the parallel resistor Rp. In the illustrated embodiment, the sensing circuit 240 includes a sensing resistor Rs and a rectifying diode D. Of course, other sensing circuits 240 are well within the broad scope of the present invention. The detection circuit 220 still further includes a safety fuse Fs coupled between the bridge circuit 230 and the sensing circuit 240.

In the illustrated embodiment, the first, second, third and fourth resistors R1, R2, R3, R4, the parallel resistor Rp and the sensing resistor Rs are preferably high resistance resistors having low power ratings. The values of the resistors are preferably selected such that a steady-state current draw through a 2 kilo-ohm resistor connected between any two parts of the first and second circuit protection devices 205a, 205b or between any such part and an equipment protective earth terminal is less than the 0.7 mA peak current required by various safety agencies. Typically, the first, second, third and fourth resistors R1, R2, R3, R4 of the bridge circuit 230 are selected to have the same values to form a balanced bridge, which causes a voltage across the sensing resistor Rs to be substantially zero under normal operating conditions. If one of the first and second circuit protection devices 205a, 205b is inoperable, however, the bridge circuit 230 will no longer be balanced and a voltage will appear across the sensing resistor Rs. Since the detection circuit 220 employs the bridge circuit 230 in a balanced bridge configuration during normal operation, the problem of high power dissipation, experienced in the prior art, is generally overcome.

In the illustrated embodiment, the alarm generation circuit 260 is coupled to the sensing circuit 240 and includes a differential mode amplifier 270, a low pass filter 280 and a voltage level comparator 290.

The differential mode amplifier 270 includes a differential capacitor 271 that is coupled across the sensing resistor Rs to sense a voltage thereacross when one or more of the first and second circuit protection devices 205a, 205b becomes inoperable. The differential mode amplifier 270 further includes first and second differential resistors 272, 273 coupled between the differential capacitor 271 and a differential amplifier 275. A feedback resistor 277 and a feedback capacitor 276 are coupled in parallel between an inverting input and an output of the differential amplifier 275. Furthermore, a grounding resistor 278 and a grounding capacitor 279 are coupled in parallel between the noninverting input of the differential amplifier 275 and a common node (e.g., ground).

The low pass filter 280 is coupled between the differential mode amplifier 270 and the voltage level comparator 290. In the illustrated embodiment, the low pass filter 280 includes a filter resistor 282 and a filter capacitor 284. The filter resistor 282 is coupled between the output of the differential amplifier 275 and an input of the voltage level comparator 290. The filter capacitor 284 is coupled between the filter resistor 282 and the common node.

The voltage level comparator 290 includes a comparator 295 that transmits the alarm signal to a controller (not shown) when at least one of the first and second circuit protection devices 205a, 205b becomes inoperable. The voltage level comparator 290 includes a first comparison resistor 292 coupled between a voltage source Vcc and an inverting input of the comparator 295. The voltage level comparator 290 further includes a second comparison resistor 294 coupled between the inverting input of the comparator 295 and the common node. The voltage level comparator 290 still further includes a pull-up resistor 296 coupled between the voltage source Vcc and an output of the comparator 295.

At any specific time, the power supply 200 operates in one of four basic modes, namely, (1) both the first and second circuit protection devices 205a, 205b are operable, (2) the first circuit protection device 205a is inoperable, (3) the second circuit protection device 205b is inoperable and (4) both the first and second circuit protection devices 205a, 205b are inoperable.

In the first mode, the parallel resistor Rp, coupled across the second circuit protection device 205b, is shorted and there will be no voltage across the sensing resistor Rs due to the configuration of the bridge circuit 230. Consequently, the output of the differential mode amplifier 270 will be nearly zero, causing the output of the alarm generation circuit 260 to be at a low logic level, thus indicating to the controller that both the first and second circuit protection devices 205a, 205b are operable.

In the second operating mode, when the first circuit protection device 205a is inoperable, the voltage balance of the bridge circuit 230 is offset. Consequently, the sensing resistor Rs generates a failure signal to indicate that one of the first and second circuit protection devices 205a, 205b is inoperable. In a preferred embodiment, the failure signal is a positive voltage with a higher potential on a terminal of the sensing resistor Rs proximate the first resistor R1. It should be understood, however, that since the input line voltage is AC, the voltage across the sensing resistor Rs can also be negative. The rectifying diode D is employed to rectify the voltage across the sensing resistor Rs. With a positive voltage appearing across the sensing resistor Rs, the differential mode amplifier 270 increases an amplitude of the failure signal and the low pass filter 280 removes a line frequency ripple associated with the failure signal. The processed failure signal is then compared to a preset reference voltage Vref, as determined by a voltage divider formed by the first and second comparison resistors 292, 294. When the first circuit protection device 205a is inoperable, a voltage of the processed failure signal (compared to the reference voltage Vref) is high enough to cause the comparator 295 to transmit a high logic level signal to the controller to indicate that the first circuit protection device 205a is inoperable.

The third operating mode is similar to the second mode inasmuch as when the second circuit protection device 205b becomes inoperable, the voltage balance of the bridge circuit 230 is offset due to the presence of the parallel resistor Rp, causing a failure signal to appear across the sensing resistor Rs. Analogous to the second operating mode, the failure signal is amplified, filtered and compared to the reference voltage Vref. Accordingly, the comparator 295 sends a high logic level signal to the controller to indicate that the second circuit protection device 205b is inoperable.

Finally, the fourth operating mode occurs when both the first and second circuit protection devices 205a, 205b become inoperable. At such a time, the sensing resistor Rs operates in series with the fourth resistor R4 and the parallel resistor Rp. Accordingly, a current will flow through the parallel and sensing resistors Rp, Rs and a failure signal (e.g., a voltage) will appear across the sensing resistor Rs. It should be noted that the presence of the parallel resistor Rp allows the failure signal to be developed across the sensing resistor Rs. As with the previously described operating modes, the failure signal is then amplified, filtered and compared to the reference voltage Vref. The comparator 295 will then transmit the high logic level signal to the controller indicating that at least one of the first and second circuit protection devices 205a, 205b has become inoperable.

Figure 3:
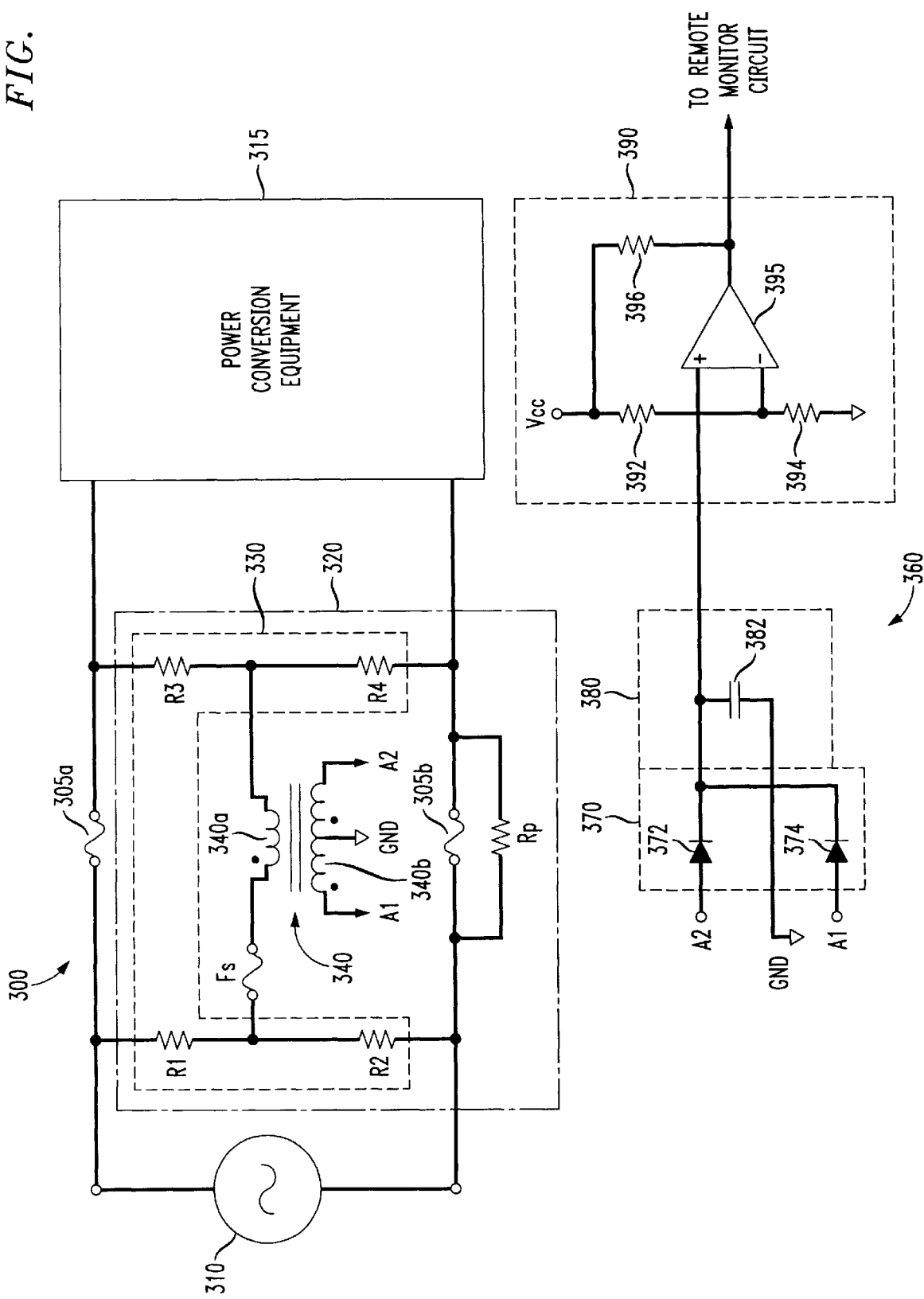
FIG. 3 illustrates a schematic diagram of another embodiment of a power supply constructed in accordance with the principles of the present invention.

Turning now to FIG. 3, illustrated is a schematic diagram of another embodiment of a power supply 300 constructed in accordance with the principles of the present invention. The power supply 300 is coupled to a source of electrical power (e.g., an AC power source) 310 and includes power conversion equipment 315. The power supply 300 further includes first and second fuses 305a, 305b interposed between the AC power source 310 and the power conversion equipment 315 to provide short circuit, ground fault and overcurrent protection to the power conversion equipment 315.

The power supply 300 further includes a detection circuit 320 that monitors the first and second fuses 305a, 305b to determine an operability thereof. The power supply 300 still further includes an alarm generation circuit 360, coupled to the detection circuit 320, that receives a failure signal from the detection circuit 320 and generates therefrom an alarm signal.

In the illustrated embodiment, the detection circuit 320 includes a bridge circuit 330 having first, second, third and fourth resistors R1, R2, R3, R4 arranged in a bridge network and coupled to the first and second fuses 305a, 305b. The detection circuit 320 further includes a parallel resistor Rp that, in the illustrated embodiment, is parallel-coupled across the second fuse 305b. Of course, in an alternative embodiment, the parallel resistor Rp may be coupled across the first fuse 305a. In the illustrated embodiment, the first, second, third and fourth resistors R1, R2, R3, R4 and the parallel resistor Rp are preferably high resistance resistors having low power ratings. Of course, other types of resistors are well within the broad scope of the present invention.

The detection circuit 320 further includes a sensing circuit 330. In the illustrated embodiment, the sensing circuit 330 includes an isolation transformer 340. A primary winding 340a of the isolation transformer 340 is coupled to first and second nodes between the first and third resistors R1, R3, and the second and fourth resistors R2, R4, respectively. The detection circuit 320 still further includes a safety fuse Fs coupled to the primary winding 340a.

The alarm generation circuit 360 is coupled to the sensing circuit 300 and includes a rectifier 370, a filter 380 and a voltage level comparator 390. In the illustrated embodiment, the rectifier includes first and second rectifying diodes 372, 374 coupled to outer taps of a secondary winding 340b of the isolation transformer 340. The filter 380 is coupled to the rectifier 370 and includes a filter capacitor 382. In the illustrated embodiment, the filter capacitor 382 is coupled to a center tap of the secondary winding 340b.

The voltage level comparator 390 includes a comparator 395 that transmits the alarm signal to a remote monitor circuit (not shown) when at least one of the first and second fuses 305a, 305b becomes inoperable. The voltage level comparator 390 further includes a first comparison resistor 392 coupled between a constant voltage source Vcc and an inverting input of the comparator 395. The voltage level comparator 390 further includes a second comparison resistor 394 coupled between the inverting input of the comparator 395 and ground. A noninverting input of the comparator 395 is coupled to the filter capacitor 382. The voltage level comparator 390 further includes a pull-up resistor 396 coupled between a voltage source Vcc and an output of the comparator 395.

The power supply 300 functions analogously to the power supply 200 illustrated and described with respect to FIG. 2. When both the first and second fuses 305a, 305b are operable, no voltage appears across the isolation transformer 340 due to the balanced bridge configuration of the first, second, third and fourth resistors R1, R2, R3, R4. Also, analogous to the power supply 200 of FIG. 2, when one or more of the first and second fuses 305a, 305b becomes inoperable, a current will flow and a voltage will appear across the primary winding 340a of the isolation transformer 340. Consequently, the secondary winding 340b will generate a failure signal that is rectified and filtered by the alarm generation circuit 360 to produce the alarm signal, which is consequently sent to a remote monitor circuit (e.g., a controller) to indicate that at least one of the first and second fuses 305a, 305b is inoperable. In a preferred embodiment, the failure signal may be a voltage or a current.

The power supplies 200, 300 illustrated and described with respect to FIGS. 2 and 3 exhibit numerous advantages over the prior art. First, the detection circuit does not draw power from the power supply when the circuit protection devices or fuses are operable. Therefore, the power supply may direct all of its power to the power conversion equipment. Second, when one or more circuit protection devices becomes inoperable, the detection circuit only draws a very small amount of power to indicate an inoperable circuit protection device. Third, no additional protection circuitry is required since the detection circuit does not suffer from AC line voltage surges as in the prior art. Furthermore, the power supply 300 disclosed in FIG. 3 does not require an external power source to generate the necessary alarm signals. Finally, the disclosed detection circuit is physically smaller than the prior art and is less complex and less costly to produce.

For a better understanding of power electronics including power supplies and conversion technologies see *Principles of Power Electronics,* by J. G. Kassakian, M. F. Schlecht and G. C. Verghese, Addison-Wesley (1991), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use with a power supply having first and second circuit protection devices, a detection circuit, comprising:
   a bridge circuit coupled to said first and second circuit protection devices;
   a resistor parallel-coupled across one of said first and second circuit protection devices; and
   a sensing circuit, coupled to said bridge circuit and said resistor, that senses an imbalance in said bridge circuit and develops therefrom a failure signal when at least one of said first and second circuit protection devices becomes inoperable.

2. The detection circuit as recited in claim 1 wherein said sensing circuit comprises a sensing resistor and a rectifying diode.

3. The detection circuit as recited in claim 1 wherein said sensing circuit comprises an isolation transformer.

4. The detection circuit as recited in claim 1 wherein said first and second circuit protection devices are fuses.

5. The detection circuit as recited in claim 1 further comprising an alarm generation circuit, coupled to said sensing circuit, that generates an alarm signal based upon said failure signal.

6. The detection circuit as recited in claim 1 wherein said alarm generation circuit comprises a differential mode amplifier, a low pass filter and a voltage level comparator.

7. The detection circuit as recited in claim 6 wherein said alarm generation circuit comprises a rectifier, a filter and a voltage level comparator.

8. A method of monitoring first and second circuit protection devices, comprising:
   coupling a bridge circuit to said first and second circuit protection devices;
   parallel-coupling a resistor to one of said first and second circuit protection devices;
   sensing an imbalance in said bridge circuit with a sensing circuit, coupled to said bridge circuit and said resistor; and
   developing, as a function of said imbalance, a failure signal when at least one of said first and second circuit protection devices becomes inoperable.

9. The method as recited in claim 8 wherein said sensing circuit comprises a sensing resistor and a rectifying diode.

10. The method as recited in claim 8 wherein said sensing circuit comprises an isolation transformer.

11. The method as recited in claim 8 wherein said first and second circuit protection devices are fuses.

12. The method as recited in claim 8 further comprising generating an alarm signal based upon said failure signal with an alarm generation circuit coupled to said sensing circuit.

13. The method as recited in claim 12 wherein said alarm generation circuit comprises a differential mode amplifier, a low pass filter and a voltage level comparator.

14. The method as recited in claim 12 wherein said alarm generation circuit comprises a rectifier, a filter and a voltage level comparator.

15. A power supply coupled to a source of electrical power, comprising:
   power conversion equipment coupled to said source of electrical power;
   first and second circuit protection devices interposed between said source of electrical power and said power conversion equipment;

a detection circuit, including:
  a bridge circuit coupled to said first and second circuit protection devices,
  a resistor parallel-coupled across one of said first and second circuit protection devices, and
  a sensing circuit, coupled to said bridge circuit and said resistor, that senses an imbalance in said bridge circuit and develops therefrom a failure signal when at least one of said first and second circuit protection devices becomes inoperable; and
an alarm generation circuit, coupled to said sensing circuit, that generates an alarm signal based upon said failure signal.

16. The power supply as recited in claim 15 wherein said sensing circuit comprises a sensing resistor and a rectifying diode.

17. The power supply as recited in claim 15 wherein said sensing circuit comprises an isolation transformer.

18. The power supply as recited in claim 15 wherein said first and second circuit protection devices are fuses.

19. The power supply as recited in claim 15 wherein said alarm generation circuit comprises a differential mode amplifier, a low pass filter and a voltage level comparator.

20. The power supply as recited in claim 15 wherein said alarm generation circuit comprises a rectifier, a filter and a voltage level comparator.

* * * * *